US012238184B2

(12) United States Patent
Kusumi et al.

(10) Patent No.: US 12,238,184 B2
(45) Date of Patent: Feb. 25, 2025

(54) NETWORK MANAGEMENT FOR EXECUTING A SERVICE USING A PLURALITY OF ENTITIES

(71) Applicant: RAKUTEN MOBILE, INC., Tokyo (JP)

(72) Inventors: Jin Kusumi, Tokyo (JP); Jin Nakazato, Tokyo (JP); Takuya Miyazawa, Tokyo (JP); Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/019,333

(22) PCT Filed: Sep. 29, 2022

(86) PCT No.: PCT/JP2022/036393
§ 371 (c)(1),
(2) Date: Feb. 2, 2023

(87) PCT Pub. No.: WO2024/069837
PCT Pub. Date: Apr. 4, 2024

(65) Prior Publication Data
US 2024/0259472 A1 Aug. 1, 2024

(51) Int. Cl.
H04L 67/51 (2022.01)
G06F 11/34 (2006.01)
H04L 9/40 (2022.01)

(52) U.S. Cl.
CPC .......... H04L 67/51 (2022.05); G06F 11/3428 (2013.01); H04L 63/062 (2013.01)

(58) Field of Classification Search
CPC ..... H04L 67/51; H04L 63/062; G06F 11/3428
(Continued)

(56) References Cited

U.S. PATENT DOCUMENTS 7,451,209 B1 * 11/2008 Schieber ............. H04L 41/5012
709/224
2006/0195578 A1 8/2006 Ishida et al.
(Continued)

FOREIGN PATENT DOCUMENTS

JP 2006-270925 A 10/2006
JP 2010-004516 A 1/2010
(Continued)

Primary Examiner — Wing F Chan
Assistant Examiner — Leon Y Tseng
(74) Attorney, Agent, or Firm — Sughrue Mion, PLLC

(57) ABSTRACT

A communication system executes a sharing process, an acquisition process, a determination process, a deployment process, and an execution process. The sharing process is a process of sharing a shared key for a plurality of entities including a communication apparatus and at least one edge server, between the plurality of entities. The acquisition process is a process of acquiring performance information, which indicates a performance of the plurality of entities, from the plurality of entities. The determination process is a process of determining services to be assigned to the plurality of entities based on the performance information. The deployment process is a process of deploying the assigned services to the plurality of entities. The execution process is a process of executing the deployed services at the plurality of entities using the shared key.

13 Claims, 9 Drawing Sheets

(58) Field of Classification Search
USPC .......................................................... 709/223
See application file for complete search history.

(56) References Cited

U.S. PATENT DOCUMENTS

| | | |
|---|---|---|
| 2006/0198507 A1 | 9/2006 | Ishida et al. |
| 2009/0316907 A1 | 12/2009 | Cachin et al. |
| 2010/0105454 A1* | 4/2010 | Weber ..................... G07F 17/32 |
| | | 463/1 |
| 2013/0238804 A1 | 9/2013 | Tanino et al. |
| 2016/0359820 A1* | 12/2016 | Bender ................. H04W 12/04 |
| 2021/0144517 A1* | 5/2021 | Guim Bernat ........ H04L 9/3247 |
| 2022/0239507 A1* | 7/2022 | Smith ............... G06F 16/90339 |
| 2023/0412369 A1* | 12/2023 | Tanaka .................. H04L 63/123 |

FOREIGN PATENT DOCUMENTS

| | | |
|---|---|---|
| JP | 2019-049905 A | 3/2019 |
| JP | 2019-211955 A | 12/2019 |
| WO | 2012/066640 A1 | 5/2012 |
| WO | WO-2018194626 A1 * | 10/2018 |

\* cited by examiner

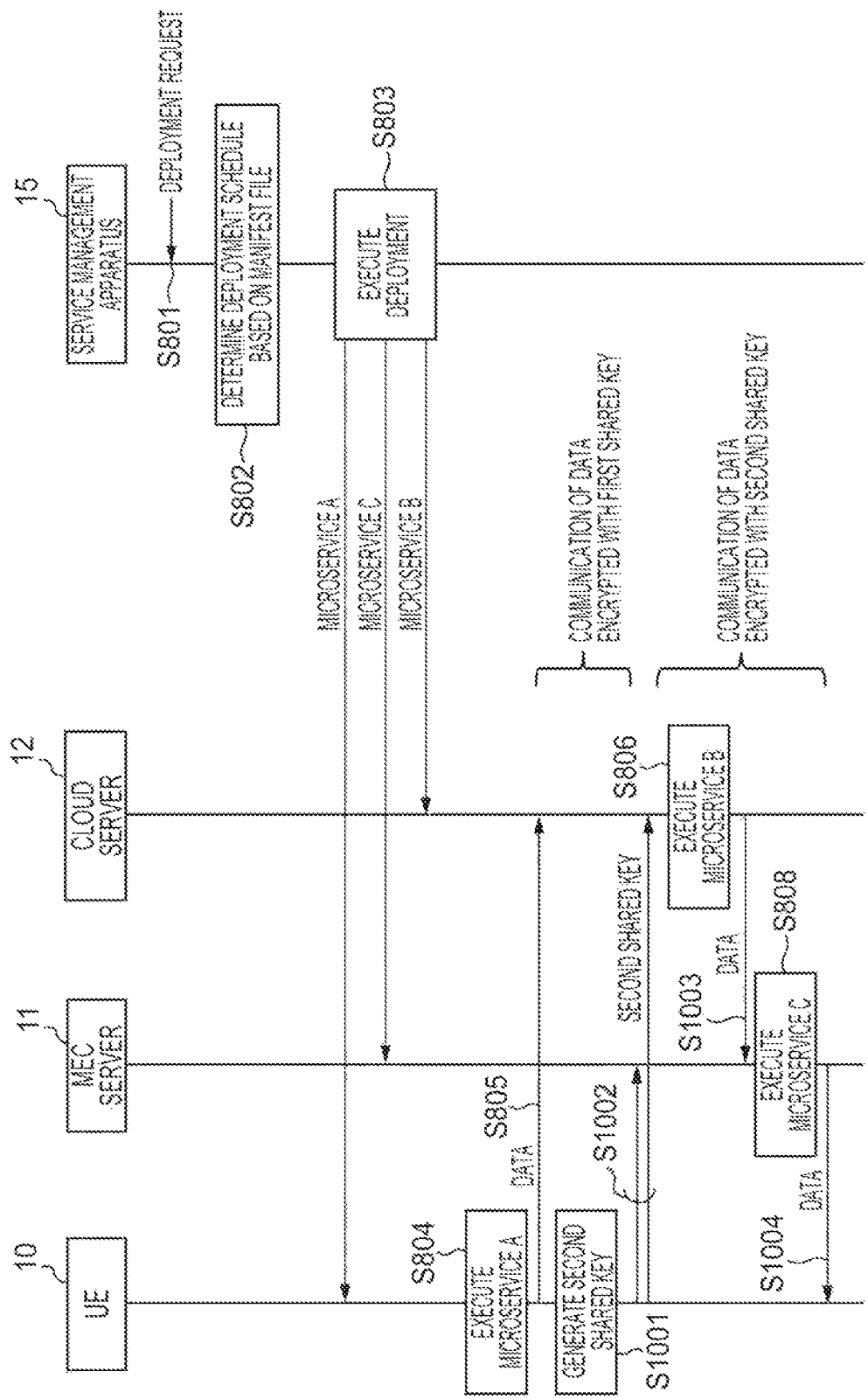

NETWORK MANAGEMENT FOR EXECUTING A SERVICE USING A PLURALITY OF ENTITIES

CROSS REFERENCE TO RELATED APPLICATIONS

This application is a National Stage of International Application No. PCT/JP2022/036393 filed Sep. 29, 2022.

TECHNICAL FIELD

The present disclosure relates to network management for executing a service using a plurality of entities.

BACKGROUND ART

In recent years, a method that provides a service by dividing the service into microservices, which are small service units, has become known. Patent Literature Document 1 discloses a technique for dividing one service into a plurality of microservices and executing the plurality of microservices using a plurality of servers (see Patent Literature Document 1). By having a plurality of servers execute one or more microservices, the execution speed of the service as a whole is improved.

LISTING OF REFERENCES

Patent Literature Documents

Patent Literature Document 1: JP 2019-211955A

SUMMARY OF THE INVENTION

Problems to be Solved by the Invention

The performance of a user equipment has improved in recent years, and it is now considered effective to have services partially executed by a user equipment. However, a framework for executing a service by dividing the service between various entities, including a user equipment, which are present on a network is yet to be proposed.

The present disclosure was conceived in view of the problem described above and has an object of providing a framework for having a service executed by entities including a user equipment.

Solution to the Problems

To solve the stated problem, a communication system according to an aspect of the present disclosure includes at least one processor, with at least one of the at least one processor executing a sharing process, an acquisition process, a determination process, a deployment process, and an execution process. The sharing process is a process of sharing, between a plurality of entities including a communication apparatus and at least one edge server, a shared key for the plurality of entities. The acquisition process is a process of acquiring performance information, which indicates a performance of the plurality of entities, from the plurality of entities. The determination process is a process of determining services to be assigned to the plurality of entities based on the performance information. The deployment process is a process of deploying the assigned services to the plurality of entities. The execution process is a process of executing the deployed services at the plurality of entities using the shared key.

To solve the stated problem, a communication apparatus according to another aspect of the present disclosure includes at least one processor, with at least one of the at least one processor executing a request process, an acquisition process, an encryption process, and an execution process. The request process is a process of transmitting a registration request, which has been encrypted using a private key, to a management apparatus. The acquisition process is a process of acquiring a shared key based on a response transmitted from the management apparatus in reply to transmission of the registration request. The encryption process is a process of encrypting a region that is at least part of a storage using a public key corresponding to the private key. The execution process is a process of executing a deployed service using the encrypted region in the storage and the shared key.

To solve the stated problem, a control method of a communication apparatus according to another aspect of the present disclosure includes: a request step of transmitting a registration request, which has been encrypted using a private key, to a management apparatus; an acquisition step of acquiring a shared key based on a response transmitted from the management apparatus in reply to transmission of the registration request; an encryption step of encrypting a region that is at least part of a storage using a public key corresponding to the private key; and an execution step of executing a deployed service using the encrypted region in the storage and the shared key.

Advantageous Effects of the Invention

According to the present disclosure, there is provided a framework for executing services at entities including a user equipment.

BRIEF DESCRIPTION OF THE DRAWINGS

FIG. 10 depicts another example of the flow of processing for deployment of microservices and execution of microservices.

DESCRIPTION OF EMBODIMENTS

Figure 1:
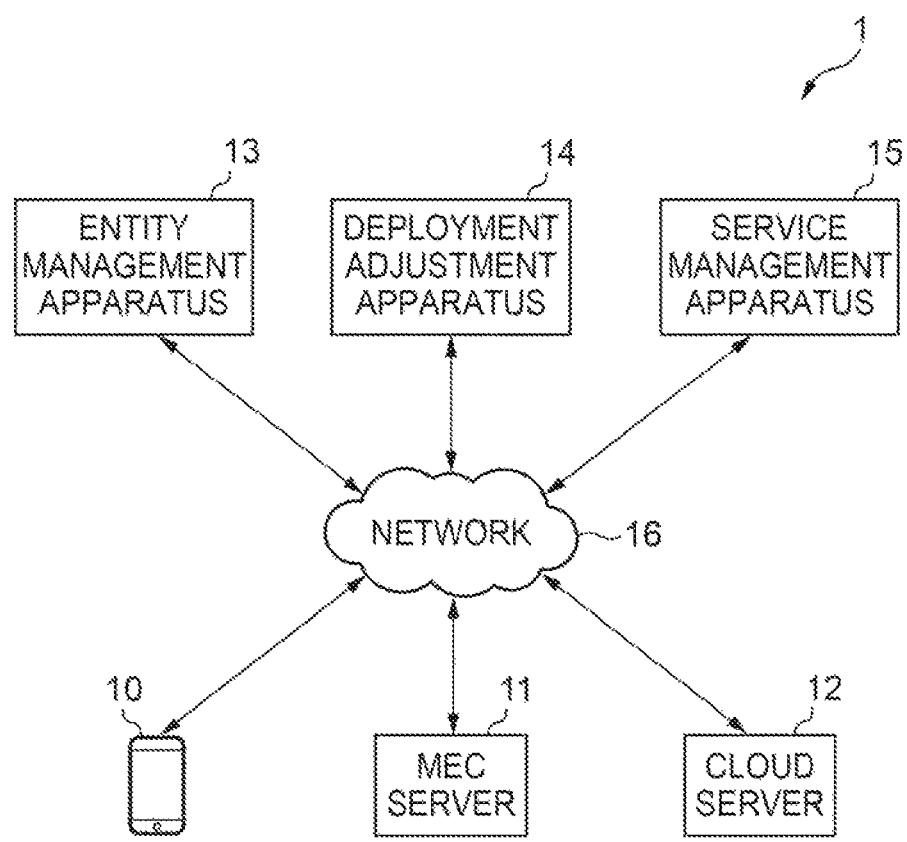
FIG. 1 depicts an example configuration of a communication system according to an embodiment of the present disclosure.

Embodiments of the present disclosure will now be described in detail with reference to the accompanying drawings. Out of the component elements described below, elements with the same functions have been assigned the same reference numerals, and description thereof is omitted. Note that the embodiments disclosed below are mere example implementations of the present disclosure, and it is possible to make changes and modifications as appropriate according to the configuration and/or various conditions of the apparatus to which the present disclosure is to be applied. Accordingly, the present disclosure is not limited to the embodiments described below. The combination of features described in these embodiments may include features that are not essential to solve the stated problem.
Configuration of Communication System FIG. 1 depicts an example configuration of a communication system 1 according to an embodiment of the present disclosure. The communication system 1 includes a user equipment (or "communication apparatus", hereinafter referred to simply as "UE") 10, a multi-access edge computing (MEC) server 11, a cloud server 12, an entity management apparatus 13, a deployment adjustment apparatus 14, a service management apparatus 15, and a network 16. Note that the communication system 1 may be configured to include a plurality of UE 10, a plurality of MEC servers 11, a plurality of cloud servers 12, and a plurality of networks 16. Also, although FIG. 1 depicts component elements of the communication system 1 outside the network 16, component elements aside from the UE 10 may be located within the network 16.

The network 16 may be a wired network and/or a wireless network. The network 16 may include a local area network (LAN), a wide area network (WAN), such as the Internet, or other data paths where a plurality of devices and/or entities are interconnected to allow communication. The network 16 may include a core network (including gateways and/or routers, switches, exchanges, and the like) and a wireless network (including base stations, gateways, and the like). The network 16 may also include a mobile network, for example, a fifth generation ("5G") network, according to 3GPP (Third Generation Partnership Project) standard. The network 16 may also include an IEEE 802.11 series wireless LAN. The network 16 may also include a peer-to-peer network. The network 16 may also include an autonomous network, such as a sensor network or a machine-to-machine (M2M) network. Also, the network 16 may use a connection architecture such as a star or a token ring.

As one example, the UE 10 is a device such as a smartphone or a tablet, and is configured so as to be capable of wireless communication. The UE 10 has a display (display screen) such as a liquid crystal display, so that a user can perform various operations using a GUI (Graphic User Interface) provided on the liquid crystal display. These operations include various operations on content, such as images, displayed on the screen, such as a tap operation, a slide operation, and a scroll operation using a finger, stylus, or the like. Note that the UE 10 may be a device such as a tablet or a notebook PC. The UE 10 may be equipped with a separate display. The UE 10 may be an M2M device that communicates autonomously. As examples, the M2M device may be a device that is infrequently moved, such as a vending machine or an electrical appliance, or may be a device worn by the user, such as a watch.

The MEC server 11 is a server apparatus (or "edge server") for edge computing (referred to as "MEC" in the present embodiment). The MEC server 11 may be disposed, via the network 16, on routes that connect to the UE 10 and the cloud server 12. The MEC server 11 is configured so as to be capable of executing any service.

The cloud server 12 is a server constructed on a wide area network such as the Internet, and the UE 10 is capable of communicating with the cloud server 12 via the network 16. The cloud server 12 is configured so as to be capable of executing any service.

In the present embodiment, the UE 10, the MEC server 11 and the cloud server 12 function as entities capable of executing microservices. When the communication system 1 includes a plurality of UE 10, a plurality of MEC servers 11, and a plurality of cloud servers 12, these devices may function as entities capable of executing microservices. A microservice is a service unit (or "processing module") obtained by dividing one service into a plurality of units, and is one unit of a service. In the present disclosure, microservices may also be referred to simply as "services". Microservices may be linked by an API (Application Programming Interface) individually provided for a service. Also, in the present disclosure, the expression "service" is understood to be synonymous with processing (that is, processing logic) and/or a service application.

In the present embodiment, encryption of communication by the UE 10 is performed so that the UE 10 can be included as an execution entity for microservices. When data obtained by the UE 10 executing a microservice is communicated to another entity via a wireless network, there is the risk of a man-in-the-middle attack. To avoid such attacks, communication by the UE 10 is encrypted.

In the present embodiment, encryption of the storage region at the UE 10 is also performed. This is because even the user of the UE 10 is not permitted to view data relating to a microservice.

By encrypting communication by the UE 10 and also encrypting the storage region at the UE 10, a secure state is ensured for the communication and execution environment, and it becomes possible to use the UE 10 as a deployment destination (that is, an execution entity) of microservices.

The entity management apparatus 13 acquires the performance of one or more entities (in FIG. 1, at least one of the UE 10, the MEC server 11, and the cloud server 12) that are execution entities of a service, and stores and manages the respective performances in a profile. The "performance" referred to here includes the storage capacity, processing speed, and the like of each entity. In the present embodiment, the performance is acquired by having each entity execute a benchmark (that is, a benchmark test). The entity management apparatus 13 is configured to request one or more entities to execute a benchmark and acquire (collect) the results of the benchmark (that is, performance information) executed at the entity in response to the request. In addition, the entity management apparatus 13 is configured to store the acquired benchmark results in a profile.

The deployment adjustment apparatus 14 acquires the profile from the entity management apparatus 13, and adjusts and determines the deployment destination of each microservice of a target service, which in the present embodiment and hereinafter refers to the service (or microservice group) to be executed. Adjustment and determination of the deployment destinations of microservices corresponds to the assignment of individual microservices to entities. After the adjustment and determination of the deployment destinations of microservices has been completed, the deployment adjustment apparatus 14 generates a manifest file that records the deployment destination (entity) for each microservice.

The service management apparatus 15 manages the target service. The target service has been uploaded to the service management apparatus 15 by an operator (not illustrated) for example, and it is possible to control the target service with the service management apparatus 15. The service management apparatus 15 determines a deployment schedule according to the manifest file generated by the deployment adjustment apparatus 14 and deploys the respective microservices according to the schedule. In the present embodiment, the "deployment" of microservices includes processing (such as the arrangement and development of microservices) for executing microservices at a deployment destination (which is any one of a plurality of entities). Note that a plurality of microservices (and possibly all of the microservices) may be pre-deployed to respective entities. In this case, each entity may be notified of the microservices to be executed.

Configuration of UE 10

Figure 2:
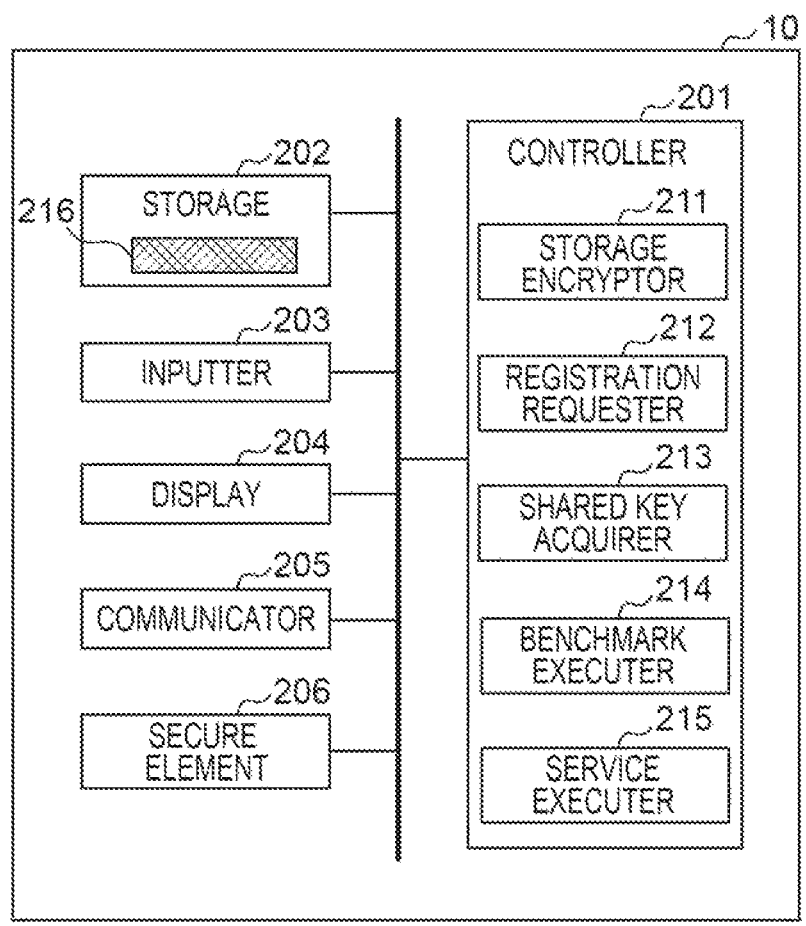
FIG. 2 depicts an example configuration of a UE (communication apparatus) according to an embodiment of the present disclosure.

FIG. 2 depicts an example configuration of the UE 10 according to the present embodiment. As the hardware configuration, the UE 10 includes a controller 201, a storage 202, an inputter 203, a display 204, a communicator 205, and a secure element 206. The UE 10 may also include an external memory (not illustrated). As a functional configuration to be executed by the controller 201, the UE 10 also includes a storage encryptor 211, a registration requester 212, a shared key acquirer 213, a benchmark executer 214, and a service executer 215.

The controller 201 is composed of one or more processors. The one or more processors may include processors such as a CPU (Central Processing Unit), an ASIC (Application Specific Integrated Circuit), an FPGA (Field Programmable Gate Array), a DSP (Digital Signal Processor), and a GPU (Graphics Processing Unit).

The storage 202 includes a volatile memory such as a DRAM (Dynamic Random Access Memory) and/or a nonvolatile memory such as an HDD (Hard Disk Drive) or SDD (Solid State Drive). The storage 202 is used as a cache area for temporarily storing data and as a work area used by programs.

In the present embodiment, at least a partial region of the storage 202 is encrypted with a public key by the storage encryptor 211. In FIG. 2, the encrypted region is indicated as "encrypted region 216".

The inputter 203 includes a touch panel, a keyboard, and the like. The display 204 includes a liquid crystal display, an organic EL (Electro-Luminescence) display, or the like which is capable of displaying information. The inputter 203 may be implemented on the display 204 as a GUI (Graphic User Interface). The communicator 205 is a communication interface for transmitting and receiving data to and from an external device.

The secure element 206 is tamper-resistant and highly secure hardware (for example, a chip), and as one example includes a CPU, memory, and the like that can withstand analysis attacks from outside. The secure element 206 is embedded in the UE 10. Alternatively, the secure element 206 is removably inserted into the UE 10.

In the present embodiment, a private key is stored in the secure element 206 when the UE 10 is shipped from the factory. The private key is kept in a secret state by being stored in the secure element 206. This secret state cannot be removed even by the user of the UE 10. Also, since the private key is stored in the secure element 206, the private key will not be erased, even when the UE 10 is reset.

In the functional configuration of the controller 101, the storage encryptor 211 encrypts at least a partial region of the storage 202 using a public key corresponding to the private key stored in the secure element 206 (that is, a public key that forms a pair with the private key). As described earlier, the encrypted region 216 in FIG. 2 is a storage region that has been encrypted by the storage encryptor 211. Unlike the private key stored in the secure element 206, the public key is erased when the UE 10 is reset.

The registration requester 212 requests the service management apparatus 15 to register (apply for) the use of the target service by the UE 10 ("use" here including the execution of microservices). In order to make the request, the registration requester 212 encrypts data including the registration request using the private key stored in the secure element 206 and transmits the encrypted data to the entity management apparatus 13.

The shared key acquirer 213 acquires a shared key generated by the entity management apparatus 13. Note that the shared key acquirer 213 may be configured to generate the shared key. The UE 10 uses the shared key to communicate data relating to microservices (for example, data obtained by executing microservices). That is, data is encrypted and decrypted using the shared key. This ensures a secure state for microservice communication by the UE 10.

The benchmark executer 214 executes a benchmark (benchmark test) for measuring the performance of the UE 10. As one example, the benchmark executer 214 uses a benchmark tool (or "benchmark application") pre-installed in the UE 10 to execute the benchmark.

The benchmark executer 214 may acquire benchmark results (that is, performance information) including an overall benchmark score by executing the benchmark. Alternatively, or in addition to this, the benchmark executer 214 may acquire benchmark results including benchmark scores for each functional item (as examples, remaining memory capacity, CPU utilization, and network performance (such as communication speed)) by executing a benchmark.

The service executer 215 executes microservices that were deployed by the service management apparatus 15. In the present embodiment, the service executer 215 uses the encrypted region 216 in the storage 202 to execute the microservices deployed to the UE 10. That is, the microservices deployed to the UE 10 are executed in cooperation with the controller 201 and the encryption region 216. By doing so, it is ensured that the microservices are executed in a secret state, and even the user of the UE 10 is incapable of viewing the data obtained by executing the microservices.

Configuration of MEC Server 11 and Cloud Server 12

Figure 3:
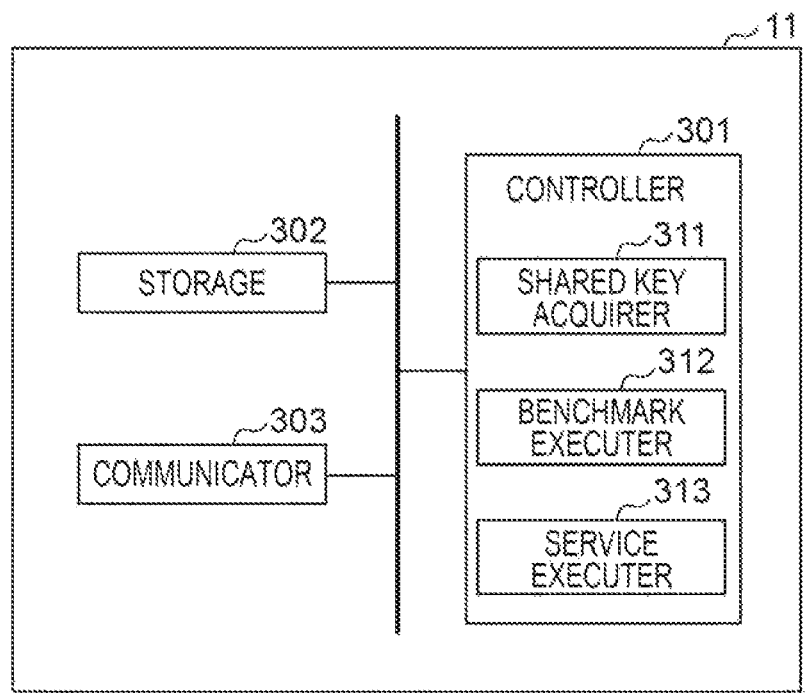
FIG. 3 depicts an example configuration of a MEC server and the cloud server according to an embodiment of the present disclosure.

FIG. 3 depicts an example configuration of the MEC server 11 according to the present embodiment. Note that in the present embodiment, the cloud server 12 also has at least the same configuration as the MEC server 11 depicted in FIG. 3, so the MEC server 11 will be described here. As the hardware configuration, the MEC server 11 includes a controller 301, a storage 302, and a communicator 303. The MEC server 11 may also include an external memory (not illustrated). As a functional configuration executed by the controller 301, the MEC server 11 also includes a shared key acquirer 311, a benchmark executer 312, and a service executer 313.

Since the fundamental configurations of the controller 301, the storage 302, and the communicator 303 are the same as those of the controller 201, the memory 202, and the communicator 205 in FIG. 2, description thereof is omitted.

In the functional configuration of the controller 301, the shared key acquirer 311 acquires the shared key generated by the entity management apparatus 13. As one example, the shared key acquirer 311 acquires the shared key from the entity management apparatus 13 via communication that can be secured (as one example, a dedicated line). Note that if the shared key has been generated by the UE 10, the shared key may be obtained from the UE 10.

The benchmark executer 312 executes a benchmark (benchmark test). As one example, the benchmark executer 312 uses a benchmark tool (or "benchmark application") pre-installed in the MEC server 11 to execute the benchmark. The benchmark executer 312 has the same functions as the benchmark executer 214 of the UE 10.

The service executer 313 executes microservices that were deployed by the service management apparatus 15. The microservices deployed to the MEC server 11 are executed in cooperation with the controller 301 and the storage 302.

Configuration of Entity Management Apparatus 13

Figure 4:
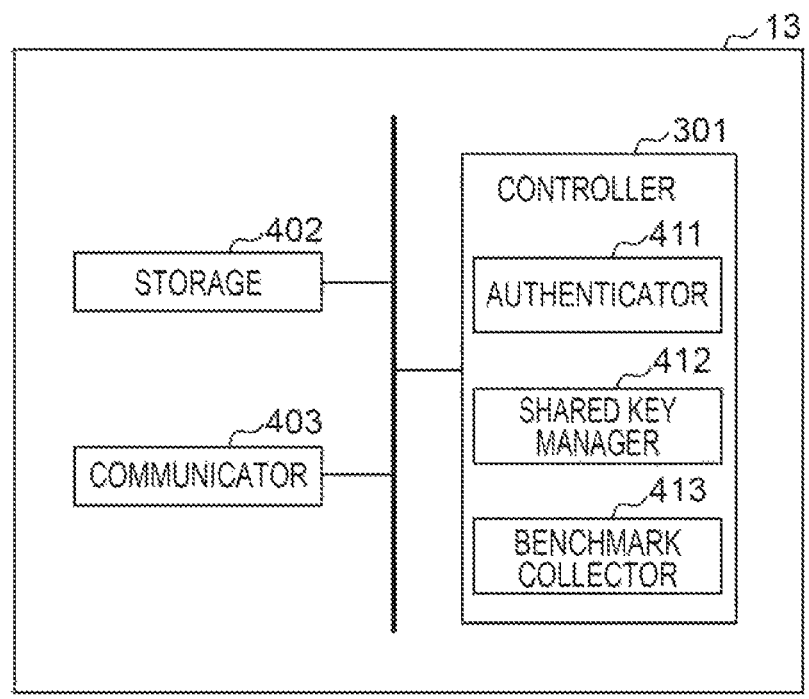
FIG. 4 depicts an example configuration of an entity management apparatus according to an embodiment of the present disclosure.

FIG. 4 depicts an example configuration of the entity management apparatus 13 according to the present embodiment. As the hardware configuration, the entity management apparatus 13 includes a controller 401, a storage 402, and a communicator 403. The entity management apparatus 13 may also include an external memory (not illustrated). As a functional configuration executed by the controller 401, the entity management apparatus 13 also includes an authenticator 411, a shared key manager 412, and a benchmark collector 413.

Since the fundamental configurations of the controller 401, the storage 402, and the communicator 403 are the same as those of the controller 201, the storage 202, and the communicator 205 in FIG. 2, description thereof is omitted. However, the entity management apparatus 13 according to the present embodiment stores a public key corresponding to the private key held in the UE 10 in the storage 402. This public key is distributed in advance to the entity management apparatus 13 via communication that can be secured (as one example, a dedicated line).

In the functional configuration of the controller 401, the authenticator 411 authenticates (recognizes) the UE 10 as an entity that executes the target service based on a registration request transmitted from the UE 10. In the present embodiment, the registration request is encrypted by the UE 10 using the private key and then transmitted. The authenticator 411 authenticates the UE 10 when decryption of the received registration request using the stored public key is successful.

The shared key manager 412 generates a shared key using a predetermined algorithm and distributes the shared key. As one example of this algorithm, AES (Advanced Encryption Standard) is known. The shared key is used to encrypt and decrypt data. The shared key may be used for communication between the entity management apparatus 13, the UE 10, the MEC server 11, and the cloud server 12. The shared key may also be used to communicate data between a plurality of entities to which microservices have been deployed.

The benchmark collector 413 performs processing for collecting benchmark results. As one example, the benchmark collector 413 transmits benchmark requests to the UE 10, the MEC server 11, and the cloud server 12, and collects benchmark results as responses of the requests. Alternatively, the benchmark collector 413 can also collect benchmark results voluntarily transmitted from the UE 10, the MEC server 11, and the cloud server 12. As described earlier, the benchmark results include an overall benchmark score and/or a benchmark score for each functional item. The benchmark collector 413 stores the collected benchmark results in a profile. That is, the benchmark collector 413 generates a profile that reflects the collected benchmarks.

Configuration of Deployment Adjustment Apparatus 14

Figure 5:
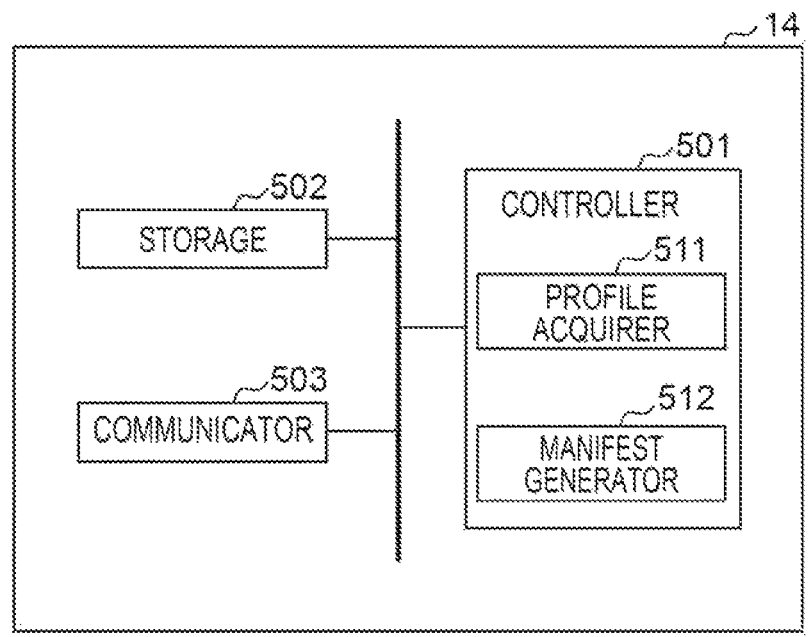
FIG. 5 depicts an example configuration of a deployment adjustment apparatus according to an embodiment of the present disclosure.

FIG. 5 depicts an example configuration of the deployment adjustment apparatus 14 according to the present embodiment. As the hardware configuration, the deployment adjustment apparatus 14 includes a controller 501, a storage 502, and a communicator 503. The deployment adjustment apparatus 14 may also include an external memory (not illustrated). As a functional configuration executed by the controller 501, the deployment adjustment apparatus 14 also includes a profile acquirer 511 and a manifest generator 512.

Since the fundamental configurations of the controller 501, the storage 502, and the communicator 503 are the same as those of the controller 201, the storage 202, and the communicator 205 in FIG. 2, description thereof is omitted.

In the functional configuration of the controller 501, the profile acquirer 511 acquires the profile generated by the entity management apparatus 13. When the service management apparatus 15 has issued an instruction for adjustment of the deployment destinations of microservices, the profile acquirer 511 may request a profile from the entity management apparatus 13 and acquire the profile as a response to this request. Alternatively, the profile acquirer 511 may voluntarily request a profile from the entity management apparatus 13 and acquire the profile as a response to this request. As another alternative, the profile acquirer 511 may acquire a profile voluntarily transmitted from the entity management apparatus 13.

The manifest generator 512 adjusts and determines the deployment destinations based on the profile acquired by the profile acquirer 511. Example processing of adjusting and determining the deployment destinations will be described later. After determining the deployment destinations, the manifest generator 512 generates a manifest file. A deployment destination of each of the plurality of microservices for the target service (that is, the entity to which each microservice is assigned) is written in this manifest file. Every time a manifest file is generated, the manifest generator 512 transmits the generated manifest file to the service management apparatus 15. Alternatively, the manifest generator 512 may be configured to transmit the manifest file when requested by the service management apparatus 15.

Configuration of Service Management Apparatus 15

Figure 6:
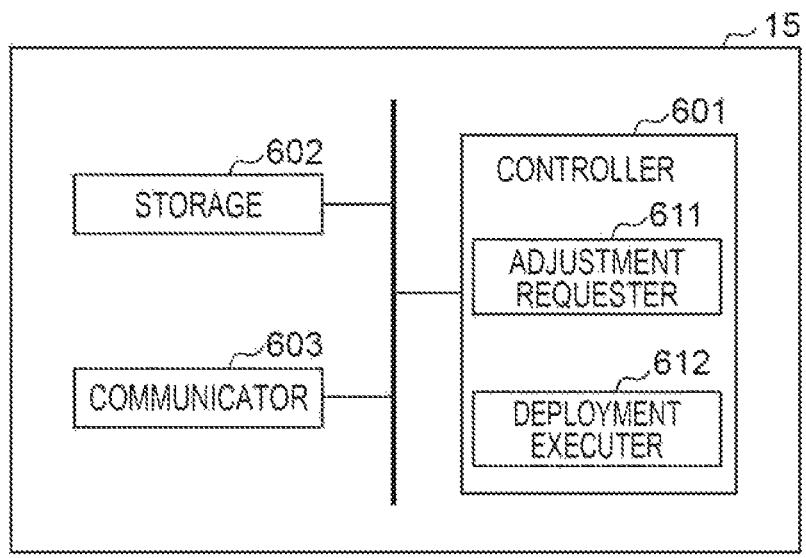
FIG. 6 depicts an example configuration of a service management apparatus according to an embodiment of the present disclosure.

FIG. 6 depicts an example configuration of the service management apparatus 15 according to the present embodiment. As the hardware configuration, the service management apparatus 15 includes a controller 601, a storage 602, and a communicator 603. The service management apparatus 15 may also include an external memory (not illustrated). As a functional configuration executed by the controller 601, the service management apparatus 15 also includes an adjustment requester 611 and a deployment executer 612.

Since the fundamental configurations of the controller 601, the storage 602, and the communicator 603 are the same as those of the controller 201, the storage 202, and the communicator 205 in FIG. 2, description thereof is omitted.

In the functional configuration of the controller 601, the adjustment requester 611 instructs (requests) the deployment adjustment apparatus 14 to adjust the deployment destinations of the microservices. This instruction may be issued at any timing.

When the deployment executer 612 has acquired a deployment request from an external apparatus or an operator, the deployment executer 612 reads the manifest file acquired from the deployment adjustment apparatus 14 and determines a deployment schedule based on the file. As one example, the deployment executer 612 determines the order and timing of deploying microservices to entities as the deployment schedule.

Note that the deployment executer 612 may be realized by a different apparatus to the service management apparatus 15.

The UE 10, the MEC server 11, the cloud server 12, the entity management apparatus 13, the deployment adjustment apparatus 14, and the service management apparatus 15 may be equipped with dedicated hardware to perform their respective functions and may execute some of their functions in hardware, with other parts being executed by a computer running a program. Alternatively, all of the functions may be performed by computers and programs.

Processing Flow

Figure 7:
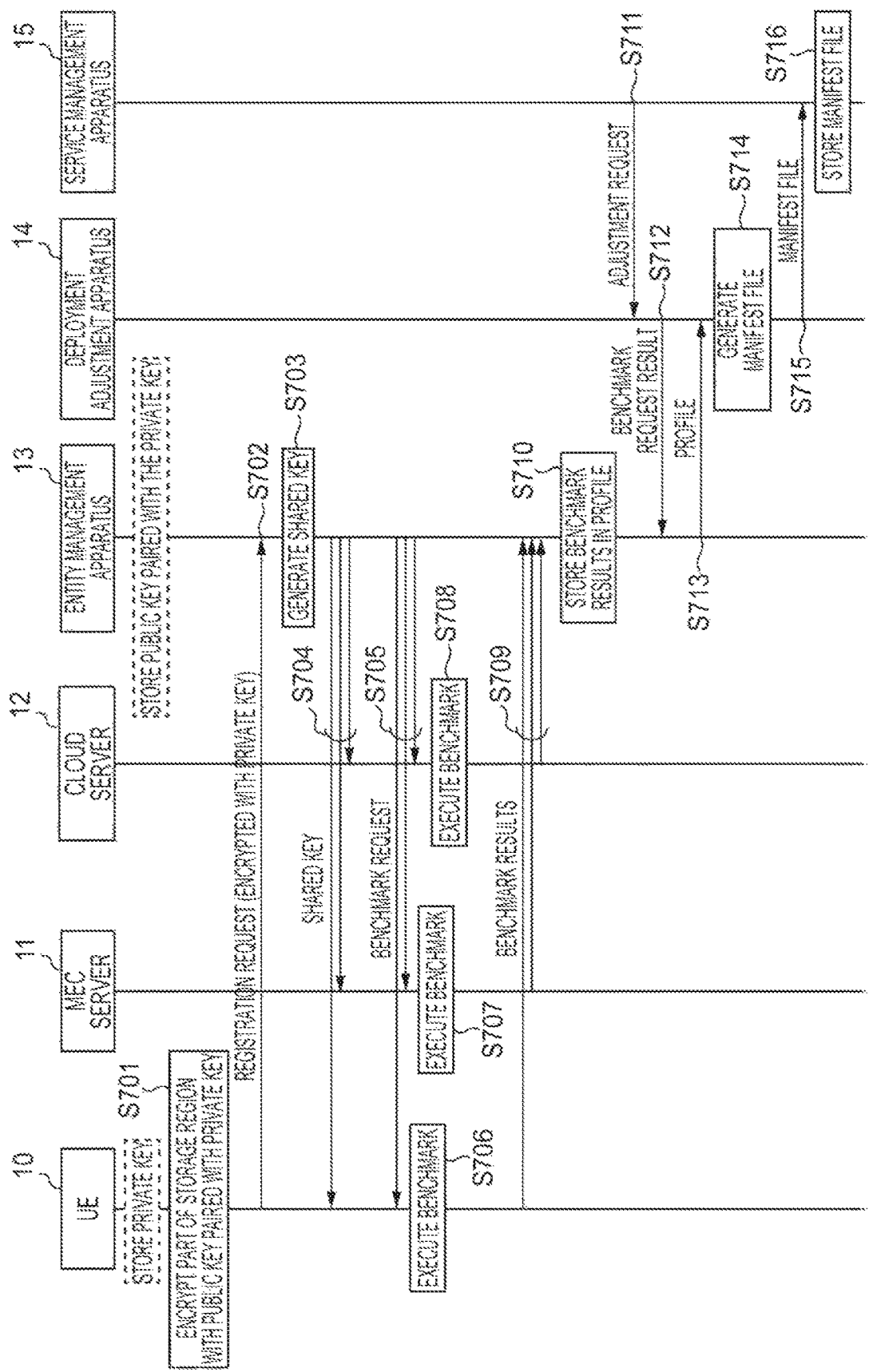
FIG. 7 depicts one example of the flow of preprocessing for deploying microservices.
Figure 8:
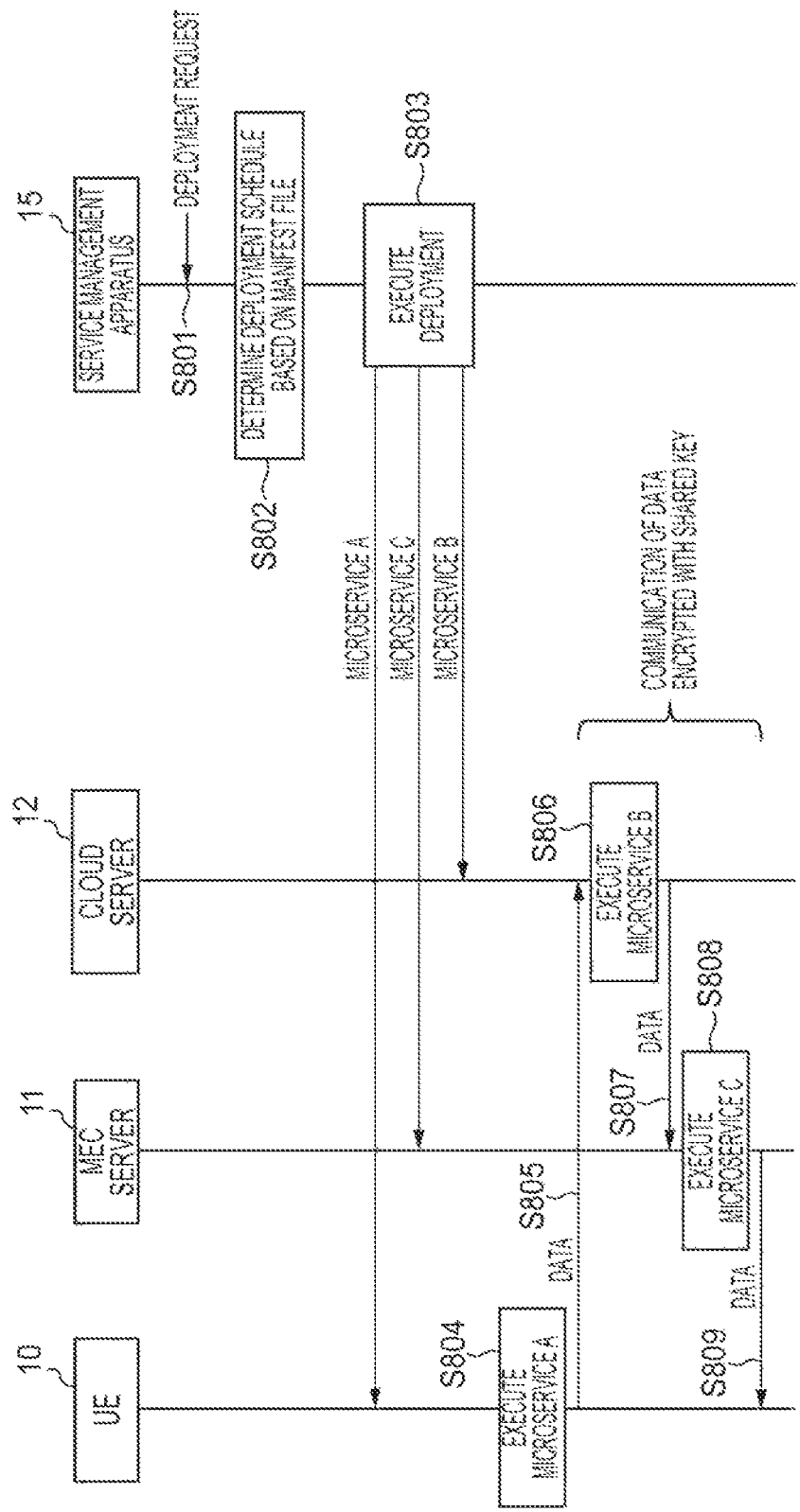
FIG. 8 depicts one example of the flow of processing for deployment of microservices and execution of microservices.

The processing flow in the communication system 1 according to the present embodiment will now be described with reference to FIGS. 7 and 8. FIG. 7 depicts the flow of pre-processing for deployment of microservices, and FIG. 8 depicts the flow of processing for microservice deployment and microservice execution performed after the flow in FIG. 7. In the present embodiment, the UE 10, the MEC server 11, and the cloud server 12 execute the deployed microservices. The target service (that is, a service (or microservice group) to be executed in this embodiment) is uploaded to the service management apparatus 15 by an operator (not illustrated). In this example, the target service is composed of a microservice A, a microservice B, and a microservice C, and is configured to be executed in order from the microservice A to the microservice C.

Note that in the following description, the UE 10, the MEC server 11, and the cloud server 12, which are the execution entities of microservices, are referred to as a "plurality of entities", and any one out of the UE 10, the MEC server 11, and the cloud server 12 may be referred to as an "entity". It is also assumed that the entity management apparatus 13 recognizes the MEC server 11 and the cloud server 12 as entities capable of executing the microservices of the target service.

First, FIG. 7 will be described. In the present embodiment, an application for using the target service is already installed in the UE 10, and each process of the UE 10 can be performed by the application. The UE 10 stores a private key in the secure element 206. As described earlier, the private key is already stored in the secure element 206, which is tamper-resistant hardware, when the UE 10 is shipped from the factory. The entity management apparatus 13 also stores the public key corresponding to the private key stored in the UE 10 in the storage 402. The public key is distributed in advance to the entity management apparatus 13 via communication that can be secured (for example, a dedicated line).

In S701, the storage encryptor 211 of the UE 10 encrypts at least a partial region of the storage 202 using the public key corresponding to the private key stored in the secure element 206 (that is, the public key that forms a pair with the private key) to secure the region as the encrypted region 216.

To register (apply for) use of the target service, the UE 10 transmits a registration request to the entity management apparatus 13, as one example, when launching the application (S702). In more detail, the registration requester 212 of the UE 10 encrypts a registration request including an ID (identification information) for identifying the UE 10 with the private key, and transmits the encrypted registration request via the communicator 205 to the entity management apparatus 13. The ID may be information for identifying the UE 10, and may be an ID physically assigned to the UE 10, an ID assigned to the application for executing microservices, or the like.

In the present embodiment, an electronic signature framework can be used for the processing in S702. In more detail, the registration requester 212 of the UE 10 compresses the registration request (plaintext) using a hash function to generate a hash value (message digest). In addition, the registration requester 212 encrypts the hash value using the private key to generate an electronic signature. The registration requester 212 transmits encrypted data including the electronic signature (or including the registration request and an electronic signature) to the entity management apparatus 13.

The authenticator 411 of the entity management apparatus 13 receives the encrypted data from the UE 10 via the communicator 403 and attempts to decrypt the encrypted data using the stored public key. This decryption will succeed using the public key that forms a pair with the private key stored by the UE 10. When the decryption is successful, the authenticator 411 confirms that the encrypted data was sent from an entity that stores the private key paired with the stored public key. That is, the authenticator 411 authenticates (recognizes) the UE 10 as an entity capable of executing microservices of the target service.

After authenticating the UE 10, the shared key manager 412 of the entity management apparatus 13 generates a shared key (S703). The shared key is generated using a predetermined algorithm, with AES as a known example. After generating the shared key, the shared key manager 412 distributes the shared key to the UE 10, the MEC server 11, and the cloud server 12 via the communicator 403 (S704). As one example, the shared key manager 412 encrypts the shared key using the public key and transmits the encrypted shared key to the UE 10. The UE 10 receives the shared key as a response to the registration request transmitted in S702 (as one example, the shared key is included in the response), and can acquire the shared key through decryption using the stored private key. The shared key manager 412 transmits the shared key to the MEC server 11 and the cloud server 12 via a dedicated line. By doing so, the shared key is shared by the UE 10, the MEC server 11, and the cloud server 12.

An expiration date may be set for the shared key. The validity period and conditions for invalidating the shared key may be set at the entity management apparatus 13 and/or at an entity.

Once the shared key has been shared by the UE 10, the MEC server 11, and the cloud server 12, the benchmark collector 413 of the entity management apparatus 13 requests the UE 10, the MEC server 11, and the cloud server 12 to execute the benchmark (S705). In more detail, the benchmark collector 413 transmits a benchmark request via the communicator 403 to the UE 10, the MEC server 11, and the cloud server 12 (S705). The benchmark request to the UE 10 may be transmitted having been encrypted with the shared key.

The benchmark executer 214 of the UE 10 receives the benchmark request via the communicator 205, executes the benchmark (S706), and transmits the benchmark result via the communicator 205 to the entity management apparatus 13 (S709). In the same way, the benchmark executer 312 of the MEC server 11 executes the benchmark (S707) and transmits the benchmark result to the entity management apparatus 13 (S709). Also in the same way, the benchmark executer 312 of the cloud server 12 executes the benchmark (S708), and transmits the benchmark result to the entity management apparatus 13 (S709). The benchmark results may include an overall benchmark score for each entity. Alternatively or in addition to this, the benchmark results may include a benchmark score for each functional item (as examples, remaining memory capacity, CPU utilization, and network performance (such as, communication speed)) at each entity.

The benchmark collector 413 of the entity management apparatus 13 collects (receives) the benchmark results via the communicator 403 as responses to the benchmark request transmitted in S705. The benchmark collector 413 stores the collected benchmark results in a profile (S710). That is, the benchmark collector 413 generates a profile reflecting the collected benchmarks. As one example, the benchmark collector 413 lists the overall benchmark score of each entity in the profile. Alternatively, or in addition to this, the benchmark collector 413 may list a benchmark score for each function item (as examples, remaining memory capacity, CPU utilization, and network performance (such as communication speed)) of each entity in the profile.

The adjustment requester 611 of the service management apparatus 15 instructs (requests) the deployment adjustment apparatus 14 to adjust the deployment destinations of the microservices (S711). In more detail, the adjustment requester 611 transmits an adjustment request via the communicator 603 to the deployment adjustment apparatus 14. The adjustment request corresponds to a generation request for a manifest file. Transmission of the adjustment request may be performed at any timing. As examples, the service management apparatus 15 may periodically transmit the adjustment request or may transmit the adjustment request when an instruction has been received from an external apparatus or an operator (not illustrated).

On receiving the adjustment request from the service management apparatus 15 (S711), the profile acquirer 511 of the deployment adjustment apparatus 14 requests the benchmark results (that is, the profile in which the benchmark results are stored) from the entity management apparatus 13 (S712). In more detail, the profile acquirer 511 transmits a benchmark result request via the communicator 503 to the entity management apparatus 13.

On receiving the benchmark result request via the communicator 403, the benchmark collector 413 of the entity management apparatus 13 transmits a profile reflecting the benchmark results to the entity management apparatus 13 (S713).

When the profile acquirer 511 of the deployment adjustment apparatus 14 has acquired the profile via the communicator 503, the manifest generator 512 starts the adjustment and determination of the deployment destinations of microservices (that is, the assignment of microservices to the entities). As one example, the manifest generator 512 defines an objective function that uses the overall benchmark score for each entity and/or the benchmark scores for each function item as elements and calculates a sum for all the microservices in the plurality of microservices. Note that in this objective function, each element may be weighted according to the requirements (such as high speed and large capacity) of each microservice. After this, the manifest generator 512 determines the deployment destinations for each of the plurality of microservices so as to maximize (or minimize) the objective function across the plurality of entities and the plurality of microservices.

As one example, the manifest generator 512 calculates the objective function for all assignment patterns in which each of a plurality of microservices is assigned to any out of the plurality of entities, and determines the combination of microservices and entities for which the objective function is maximized (or minimized). Since calculating every possible pattern would involve an enormous amount of calculation and a high processing load, freely chosen constraint conditions may be provided.

After determining the deployment destinations (that is, when the assigning of microservices to entities has been completed), the manifest generator 512 generates a manifest file in which a deployment destination (that is, one out of the plurality of entities) is recorded for each microservice (S714). The manifest generator 512 transmits the generated manifest file via the communicator 503 to the service management apparatus 15 (S715).

The adjustment requester 611 of the service management apparatus 15 receives the manifest file as a response to the adjustment request transmitted in S713 and stores the manifest file in the storage 502 (S716).

As depicted in FIG. 7, in S714, the deployment adjustment apparatus 14 determines the deployment destinations based on the profile, which reflects the benchmark results of the plurality of entities, received from the entity management apparatus 13 and generates a manifest file. On the other hand, the performance of the plurality of entities may dynamically change. For this reason, to appropriately determine the deployment destinations of the microservices, the entity management apparatus 13 needs to collect the latest benchmark results and the deployment adjustment apparatus 14 needs to generate a profile that reflects these latest benchmark results.

To collect the latest benchmark results, as one example, the benchmark collector 413 of the entity management apparatus 13 may periodically transmit benchmark requests to the UE 10, the MEC server 11, and the cloud server 12 (S705). The benchmark collector 413 may store the benchmark results collected in response to the requests in a profile and may transmit the profile to the deployment adjustment apparatus 14. Here, the benchmark collector 413 of the entity management apparatus 13 may transmit the profile in keeping with reception of a benchmark result request (S712), or may transmit the profile in keeping with generation of the profile regardless of whether a benchmark result request has been received.

Alternatively, an entity out of the UE 10, the MEC server 11, and the cloud server 12 that has detected a change in performance, such as a performance expansion, may be configured to voluntarily execute the benchmark and transmit the benchmark result to the entity management apparatus 13. In this case, the benchmark collector 413 of the entity management apparatus 13 may generate a profile from the received benchmark results and may transmit the profile to the deployment adjustment apparatus 14.

On receiving the profile from the entity management apparatus 13, the manifest generator 512 of the deployment adjustment apparatus 14 can determine the deployment destinations of the microservices and generate a manifest file (S714). The generated manifest file is transmitted to the service management apparatus 15 (S715). The service management apparatus 15 can store the latest manifest file by updating the stored manifest file using this received manifest file.

Since the performance of an entity (and in particular network performance (such as communication speed)) may fluctuate according to the time period during the day, the benchmark collector 413 of the entity management apparatus 13 may be configured to acquire benchmark results from the plurality of entities in a plurality of time periods. In this case, as one example, the benchmark collector 413 of the entity management apparatus 13 may transmit a benchmark request in each of a plurality of time periods (S705) and may acquire benchmark results as responses to the requests (S709). On receiving the benchmark requests, the plurality of entities execute the benchmark (S706, S707, S708) and transmit the benchmark results to the entity management apparatus 13 (S709).

The manifest file generated by the deployment adjustment apparatus 14 may be changed by the operator. As one example, when a manifest file has been generated using a REST API (Representational State Transfer Application Program Interface), the manifest file may be updated or changed via this API.

Next, FIG. 8 will be described. When the preprocessing for deployment of the microservices depicted in FIG. 7 has been completed, the service management apparatus 15 enters a standby state for a deployment request from an external apparatus or the operator (not illustrated). As one example, the deployment request is issued by a network monitoring apparatus (not illustrated) that monitors the network status. The network monitoring apparatus monitors the network status and issues a deployment request to the service management apparatus 15 when a need for deployment or redeployment has been detected. Alternatively, a deployment request may be made at any timing by the operator. The deployment request may be made asynchronously with actions of the UE 10.

When a deployment request has been issued (S801), the deployment executer 612 of the service management apparatus 15 reads the manifest file stored in S716. The deployment executer 612 determines a deployment schedule based on the manifest file (S802). As one example, the deployment executer 612 determines the order and/or timing for deploying microservices to entities.

After this, the deployment executer 612 deploys each of the plurality of microservices to any of the plurality of entities according to the manifest file and the determined deployment schedule (S803). In the example in FIG. 8, the deployment executer 612 deploys the microservice A to the UE 10, the microservice C to the MEC server 11, and the microservice B to the cloud server 12.

The deployment referred to here may include the deployment executer 612 transmitting a service application (that is, a program) for executing a microservice to an entity via the communicator 603. As one example, the deployment executer 612 may transmit a service application for executing the microservice A to the UE 10, a service application for executing the microservice C to the MEC server 11, and a service application for executing the microservice B to the cloud server 12.

When all of the service applications for realizing the target service have been installed in the respective entities, deployment includes transmitting instructions for executing the assigned microservices via the communicator 603. These instructions may include instructions for launching applications for executing the microservices. As one example, the deployment executer 612 may transmit an instruction for executing the microservice A to the UE 10, an instruction for executing the microservice C to the MEC server 11, and an instruction for executing the microservice B to the cloud server 12.

The deployment may also include giving notice of the execution order of microservices and the transmission destination of the data obtained by executing a microservice (that is, data that is the execution result (or processing result)). By doing so, it becomes possible for each entity to transmit the data obtained by executing a microservice to the indicated destination.

The indicated transmission destination of the data is not limited to any one out of the plurality of entities (that is, the UE 10, the MEC server 11, and the cloud server 12) that execute the microservices.

As one example, when the communicators of the respective entities (that is, the communicator 205 and the communicator 303) have a table of transmission destinations for execution result data, when an entity is to transmit data to an apparatus on the network 16, the data will be transmitted to an entity in accordance with this table.

The transmission of execution result data may also be controlled by a relay point, such as UPF (User Plane Function), which is a function on a 5G network. As one example, control may be performed to transmit received data to the correct transmission destination. As one example, if the relay point stores an execution order of the microservices and the relationship between execution entities (that is, the transmission destinations of data), when an entity transmits data to a device on the network 16, the relay point will transmit the data to an entity in keeping with the stored relationship.

Each entity to which a microservice has been deployed executes the deployed microservice(s). In the example in FIG. 8, the service executer 215 of the UE 10 executes the microservice A (S804). Here, the UE 10 executes the microservice A in the encrypted region 216 of the storage 202. The service executer 215 of the UE 10 then transmits the data obtained by executing the microservice A via the communicator 205 to the cloud server 12 (S805). The service executer 313 of the cloud server 12 receives the data of the microservice A via the communicator 303. The service executer 313 of the cloud server 12 executes the microservice B together with the received data (S806), and transmits the data obtained by this execution via the communicator 303 to the MEC server 11 (S807). The service executer 313 of the MEC server 11 receives data of the microservice B via the communicator 303. The service executer 313 of the MEC server 11 executes the microservice C together with the received data (S808), and transmits the data obtained by this execution via the communicator 303 to the UE 10 (S809). Each entity uses the shared key received in S704 in FIG. 7 to encrypt data when data is transmitted and to decrypt data when data is received.

By doing so, when, for example, the target service is a moving object tracking process (a service that includes object tracking and image synthesis) and the microservice A is object recognition, the microservice B is tracking, and the microservice C is image synthesis, the UE 10 can receive data produced by image synthesis.

In this way, according to the present embodiment, by sharing a shared key generated by the entity management apparatus 13 among a plurality of entities including the UE 10, it is possible for the plurality of entities to securely exchange data when executing microservices.

In addition, the UE 10 generates an encrypted region 216 by encrypting at least a partial region of the storage 202 using a public key corresponding to the private key stored in the secure element 206. After this, at the UE 10, by executing a microservice using the encrypted region 216 in the storage 202, a secure state for data related to the microservice is also ensured inside the UE 10.

Also, in the present embodiment, the deployment destinations of microservices are determined based on performance information that is the result of a plurality of entities executing benchmarks. This means that it is possible to adjust and determine the deployment destinations in keeping with the characteristics of the respective entities and services.

Modifications

Figure 9:
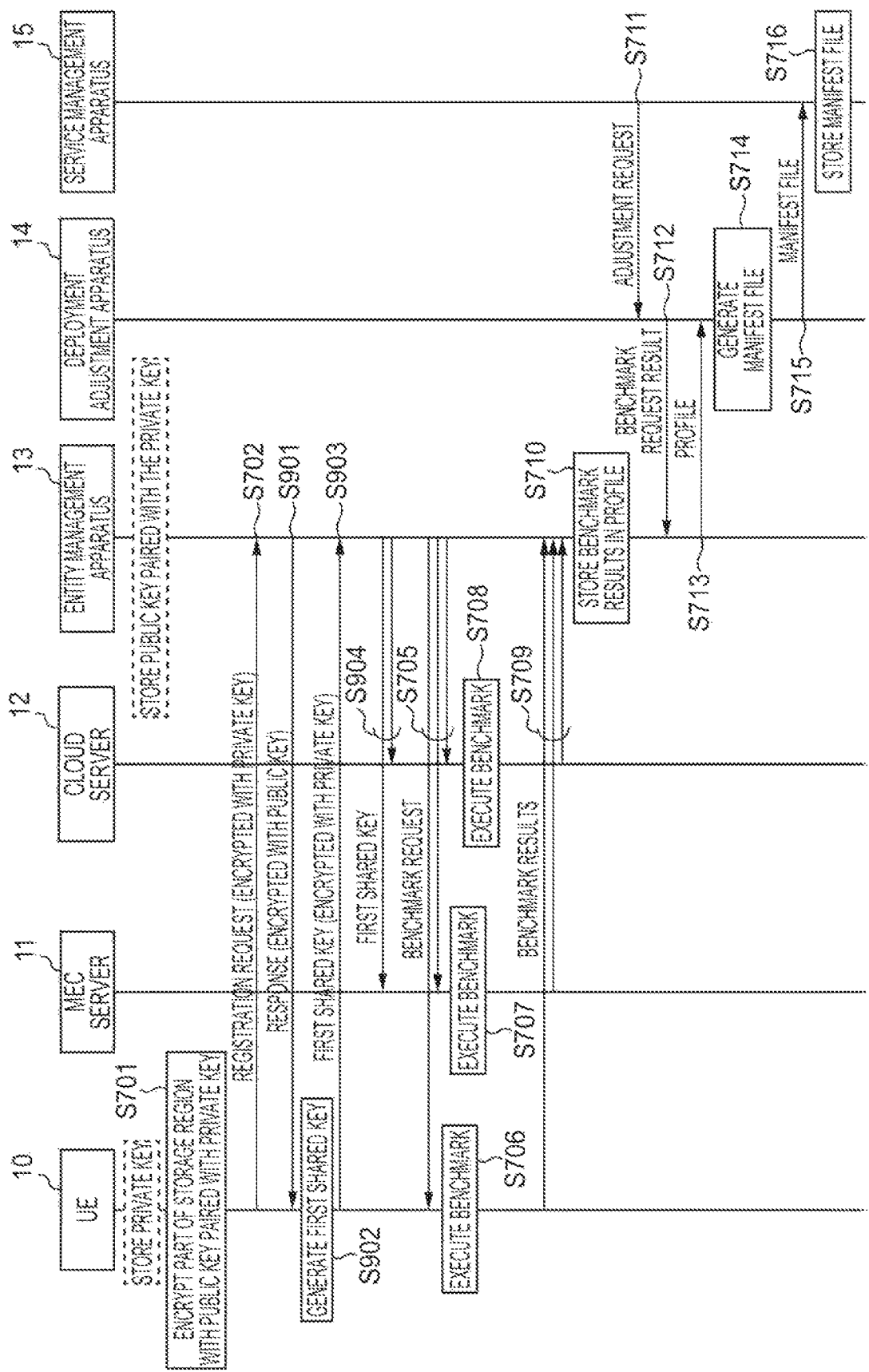
FIG. 9 depicts another example of the flow of preprocessing for deploying microservices.

Although the shared key is generated by the entity management apparatus 13 in the embodiment described above, it is also possible to use a configuration where the UE 10 generates the shared key. A modification will now be described with reference to FIGS. 9 and 10. FIG. 9 depicts the flow of preprocessing for deployment of microservices according to a modification, and FIG. 10 depicts the flow of processing for microservice deployment and microservice execution performed after the flow in FIG. 9. Note that in FIG. 9, processes that are the same as in FIG. 7 have been assigned the same reference numerals and description thereof is omitted. In the same way, in FIG. 10, processes that are the same as in FIG. 8 have been assigned the same reference numerals and description thereof is omitted.

In S702, when a registration request has been received and the UE 10 has been authenticated, the authenticator 411 of the entity management apparatus 13 encrypts the response to the request with the public key and transmits the encrypted response via the communicator 403 to the UE 10 (S901). On receiving the response via the communicator 205, the shared key acquirer 213 of the UE 10 generates a first shared key (S902). The shared key is generated using a predetermined algorithm, with AES as a known example. The shared key acquirer 213 of the UE 10 encrypts the generated first shared key with the private key, and transmits the encrypted first shared key via the communicator 205 to the entity management apparatus 13 (S903). Here, the shared key acquirer 213 of the UE 10 may also transmit a shared key encryption key for decrypting the shared key generated by the UE 10 to the entity management apparatus 13.

The shared key manager 412 of the entity management apparatus 13 acquires the first shared key via the communicator 403 from the UE 10. The shared key manager 412 may also acquire a shared key encryption key. The shared key manager 412 distributes the first shared key to the MEC server 11 and the cloud server 12 (S904). As one example, the shared key manager 412 transmits the first shared key via a dedicated line to the MEC server 11 and the cloud server 12. By doing so, the first shared key is shared by the UE 10, the MEC server 11, and the cloud server 12. In FIG. 9, the processing from S705 onward is the same as in FIG. 7.

Next, FIG. 10 will be described. According to a deployment schedule (S802) determined in response to a deployment request (S801), the service management apparatus 15 deploys the microservice A to the UE 10, the microservice C to the MEC server 11, and the microservice B to the cloud server 12 (S803). The service executer 215 of the UE 10 executes the microservice A (S804), and transmits the data obtained by this execution via the communicator 205 to the cloud server 12 (S805). The data transmitted to the cloud server 12 is encrypted with the first shared key generated in S902, and the cloud server 12 can decrypt the received data with the first shared key shared in S904.

In the present embodiment, the shared key acquirer 213 of the UE 10 generates a second shared key (S1001), and transmits the second shared key via the communicator 205 to the MEC server 11 and the cloud server 12 (S1002). The second shared key may be encrypted with a shared key encryption key and then transmitted. The shared key acquirers 311 of the MEC server 11 and the cloud server 12 acquire the second shared key transmitted from the UE 10 via the respective communicators 303. When a shared key encryption key has been shared, the shared key acquirers 311 of the MEC server 11 and the cloud server 12 decrypt and acquire the second shared key acquired from the UE 10 using this shared key encryption key. The service executer 313 of the cloud server 12 executes the microservice B (S806), and transmits the data obtained by this execution via the communicator 303 to the MEC server 11 (S807). Data transmitted to the MEC server 11 is encrypted with the second shared key, and the MEC server 11 can decrypt the received data with the second shared key. In the same way, the service executer 313 of the MEC server 11 executes the microservice C (S808), and transmits the data obtained by the execution via the communicator 303 to the UE 10 (S1004). Data to be transmitted to the UE 10 is encrypted with the second shared key, and the UE 10 can decrypt the received data with the second shared key.

Note that although the second shared key (S1002) is transmitted from the UE 10 separately from the data (S805) in the example in FIG. 10, it is also possible to transmit the second shared key (S1002) together with the data (S805). In this case, as one example, the UE 10 may use the first shared key to encrypt the second shared key, and the MEC server 11 and the cloud server 12 may use the first shared key to decrypt and acquire the second shared key.

Also, although the entity management apparatus 13 is not notified of the second shared key generated by the UE 10 in the example in FIG. 10, it is also possible for the UE 10 to be configured to encrypt the second shared key using, for example, the private key, a shared key encryption key, or the first shared key and to transmit the encrypted second shared key to the entity management apparatus 13. By doing so, it is possible for the entity management apparatus 13 to share information on the shared key used for data communication.

Also, although a procedure where the UE 10 generates a shared key has been described in this modification, as another example, the entity management apparatus 13 may generate a first shared key and the UE 10 may generate a second shared key. In this case, the entity management apparatus 13 may generate the first shared key and share the first shared key with a plurality of entities according to the procedure described in the above embodiment, and then the UE 10 may generate the second shared key and share the second shared key with a plurality of entities according to the procedure described in this modification.

In this way, according to this modification, the UE 10 generates a shared key and supplies the shared key to the MEC server 11 and the cloud server 12, which makes it possible to perform data communication relating to microservices between the UE 10, the MEC server 11, and the cloud server 12 using the shared key. In addition, the UE 10 may generate a new shared key (an updated shared key) and supply the shared key to the MEC server 11 and the cloud server 12, which makes it possible for the UE 10, the MEC server 11, and the cloud server 12 to use the updated shared key for data communication relating to microservices. In this way, by using the updated shared key, the cryptographic strength of data communication that results from execution of microservices is further strengthened.

It should be noted that although specific embodiments have been described above, the embodiments are merely examples and are not intended to limit the scope of the present disclosure. The apparatus and methods described in this specification may be embodied in forms other than those described above. Also, appropriate omissions, substitutions, and modifications may be made to the above-described embodiments without departing from the scope of the present disclosure. Such omissions, substitutions and modifications are included in the scope of the claims and their equivalents, and are within the technical scope of the present disclosure.

Embodiments of the Present Disclosure

The present disclosure includes the following embodiments.

(1) A communication system includes at least one processor, wherein at least one out of the at least one processor executes: a sharing process of sharing, between a plurality of entities including a communication apparatus and at least one edge server, a shared key for the plurality of entities; an acquisition process of acquiring performance information, which indicates a performance of the plurality of entities, from the plurality of entities; a determination process of determining services to be assigned to the plurality of entities based on the performance information; a deployment process of deploying the assigned services to the plurality of entities; and an execution process of executing the deployed services at the plurality of entities using the shared key.

(2) In the communication system according to (1), the acquisition process includes transmitting a benchmark request to the plurality of entities and acquiring the performance information by way of benchmark results received from the plurality of entities in response to the request.

(3) In the communication system according to (1) or (2), the acquisition process includes acquiring the performance information periodically.

(4) In the communication system according to any one of (1) to (3), the acquisition process includes acquiring the performance information when notification of a change in performance of the plurality of entities has been received.

(5) In the communication system according to any one of (1) to (4), the plurality of entities further include a server constructed on the Internet.

(6) A communication apparatus includes at least one processor, wherein at least one out of the at least one processor executes: a request process of transmitting a registration request, which has been encrypted using a private key, to a management apparatus; an acquisition process of acquiring a shared key based on a response transmitted from the management apparatus in reply to transmission of the registration request; an encryption process of encrypting a region that is at least part of a storage using a public key corresponding to the private key; and an execution process of executing a deployed service using the encrypted region in the storage and the shared key.

(7) In the communication apparatus according to (6), the acquisition process includes acquiring the shared key included in the response.

(8) In the communication apparatus according to (6) or (7), the acquisition process includes acquiring the shared key by generating the shared key in keeping with the response.

(9) In the communication apparatus according to any one of (6) to (8), the private key is stored in a secure element provided in the communication apparatus.

(10) In the communication apparatus according to any one of (6) to (9), the execution process includes: encrypting data obtained by executing the deployed service using the shared key; and transmitting the encrypted data to at least one other apparatus that executes another service using the data.

(11) In the communication apparatus according to any one of (6) to (9), the execution process includes: receiving data, which has been encrypted using the shared key, from at least one other apparatus; and decrypting the encrypted data using the shared key and executing the deployed service using the decrypted data.

(12) A control method of a communication apparatus includes: a request step of transmitting that transmits a registration request, which has been encrypted using a private key, to a management apparatus; an acquisition step of acquiring a shared key based on a response transmitted from the management apparatus in reply to transmission of the registration request; an encryption step of encrypting a region that is at least part of a storage using a public key corresponding to the private key; and an execution step of executing a deployed service using the encrypted region in the storage and the shared key.

REFERENCE NUMERALS AND SYMBOLS

1: Communication system
10: UE (Communication apparatus)
11: MEC server
12: Cloud server,
13: Entity management apparatus
14: Deployment adjustment apparatus
15: Service management apparatus
201: Controller
202: Storage
203: Inputter
204: Display
205: Communicator
211: Storage encryptor
212: Registration requester
213: Shared key acquirer
214: Benchmark executer
215: Service executer
216: Encrypted region
301: Controller
302: Storage
303: Communicator
311: Shared key acquirer
312: Benchmark executer
313: Service executer
401: Controller
402: Storage
403: Communicator
411: Authenticator
412: Shared key manager
413: Benchmark collector
501: Controller
502: Storage
503: Communicator
511: Profile acquirer
512: Manifest generator
601: Controller
602: Storage
603: Communicator
611: Adjustment requester
612: Deployment executer

The invention claimed is:

1. A communication system comprising:
at least one hardware processor that is configured to implement at least one first entity,
wherein the at least one hardware processor is further configured to execute:
a sharing process of sharing, between the at least one first entity and a plurality of second entities, a shared key for the plurality of second entities, the plurality of second entities including a communication apparatus and at least one edge server;

an acquisition process of acquiring, by the at least one first entity, performance information, which indicates a performance of the plurality of second entities, from the plurality of second entities;

a determination process of determining, by the at least one first entity, services to be assigned to the plurality of second entities based on the performance information; and a deployment process of deploying, by the at least one first entity, the assigned services to the plurality of second entities, wherein the plurality of second entities are configured to execute the deployed services using the shared key.

2. The communication system according to claim 1, wherein the acquisition process includes transmitting, by the at least one first entity, a benchmark request to the plurality of second entities and acquiring, by the at least one first entity, the performance information by way of benchmark results received from the plurality of second entities in response to the request.

3. The communication system according to claim 1, wherein the acquisition process includes acquiring, by the at least one first entity, the performance information periodically.

4. The communication system according to claim 1, wherein the acquisition process includes acquiring, by the at least one first entity, the performance information when notification of a change in performance of the plurality of second entities has been received.

5. The communication system according to claim 1, wherein the plurality of second entities further include a server constructed on the Internet.

6. A communication apparatus comprising:
at least one hardware processor,
wherein the at least one hardware processor is configured to execute:
   a request process of transmitting a registration request, which has been encrypted using a private key, to a management apparatus;
   an acquisition process of acquiring a shared key based on a response transmitted from the management apparatus in reply to transmission of the registration request;
   an encryption process of encrypting a region that is at least part of a storage using a public key corresponding to the private key; and
   an execution process of executing a deployed service using the encrypted region in the storage and the shared key.

7. The communication apparatus according to claim 6, wherein the acquisition process includes acquiring the shared key included in the response.

8. The communication apparatus according to claim 6, wherein the acquisition process includes acquiring the shared key by generating the shared key in keeping with the response.

9. The communication apparatus according to claim 6, wherein the private key is stored in a secure element provided in the communication apparatus.

10. The communication apparatus according to claim 6, wherein the execution process includes:
   encrypting data obtained by executing the deployed service using the shared key; and
   transmitting the encrypted data to at least one other apparatus that executes another service using the data.

11. The communication apparatus according to claim 6, wherein the execution process includes:
   receiving data, which has been encrypted using the shared key, from at least one other apparatus; and
   decrypting the encrypted data using the shared key and executing the deployed service using the decrypted data.

12. The communication apparatus according to claim 6, wherein the at least one hardware processor is further configured to:
   receive a service application from a service management apparatus; and
   execute the service application, as the deployed service, using the encrypted region in the storage and the shared key.

13. A control method of a communication apparatus comprising:
   a request step of transmitting a registration request, which has been encrypted using a private key, to a management apparatus;
   an acquisition step of acquiring a shared key based on a response transmitted from the management apparatus in reply to transmission of the registration request;
   an encryption step of encrypting a region that is at least part of a storage using a public key corresponding to the private key; and
   an execution step for executing a deployed service using the encrypted region in the storage and the shared key.

* * * * *